United States Patent [19]

Gunmar et al.

[11] Patent Number: 5,179,722
[45] Date of Patent: Jan. 12, 1993

[54] METHOD FOR DETERMINING MULTIPLE INTERFERENCE IN A MOBILE RADIO SYSTEM

[76] Inventors: Krister Gunmar; Ulf Tegth, both of S-13680, Haninge, Sweden

[21] Appl. No.: 611,522

[22] Filed: Nov. 13, 1990

[30] Foreign Application Priority Data

Dec. 18, 1989 [SE] Sweden ................................ 8904251

[51] Int. Cl.$^5$ .............................................. H04Q 7/00
[52] U.S. Cl. .................................. 455/33.1; 455/56.1; 455/67.3; 455/67.7; 379/59
[58] Field of Search ...................... 455/33, 54, 56, 67, 455/226, 33.1, 54.1, 56.1, 67.1, 67.3, 67.7, 226.2, 226.3, 226.4; 379/59, 60

[56] References Cited

U.S. PATENT DOCUMENTS

| | | | |
|---|---|---|---|
| 4,355,411 | 10/1982 | Reudink et al. | 455/33 |
| 4,638,479 | 1/1987 | Alexis | 455/56 |
| 4,667,202 | 5/1987 | Kammerlander et al. | 455/56 |
| 4,736,453 | 4/1988 | Schloemer | 455/33 |
| 4,743,303 | 2/1988 | Koch | 455/67 |
| 5,038,399 | 8/1991 | Bruckert | 455/54 |

FOREIGN PATENT DOCUMENTS

| | | |
|---|---|---|
| 90/10341 | 7/1990 | Sweden . |
| 90/10342 | 7/1990 | Sweden . |
| 9010341 | 7/1990 | World Int. Prop. O. . |
| 9010342 | 7/1990 | World Int. Prop. O. . |

Primary Examiner—Reinhard J. Eisenzopf
Assistant Examiner—Edward Urban
Attorney, Agent, or Firm—Oblon, Spivak, McClelland, Maier & Neustadt

[57] ABSTRACT

The invention relates to a method for determining the total downlink or uplink interference percentage in the coverage area of a designated base station for a mobile radio system with a given channel plan. The invention provides for the need to carry out, after a conventional channel allocation has been carried out, a check of the extent to which total interference requirements are met. The method consists in that field strengths from all base stations are measured on all traffic routes within the geographical area of the mobile radio system. The interference is calculated at each point within the coverage area of a base station for each relevant pair of base stations, preferably base stations which are located in the same channel and base stations which are located in an adjacent channel. The interferences of all the relevant pairs of base stations are added in order to form the total interference at each point. The invention makes it possible to calculate the total interference percentage which constitutes the ratio between the length of road distance with disturbed coverage and the length of total road distance with coverage. The interference percentage is calculated suitably within a contour which limits the coverage area of the base station concerned.

5 Claims, 5 Drawing Sheets

0. X: 160122  163034
0. Y: 657382  660106

Downlink Interference
26-APR-89
Coverage DBM:
 -93.0
C/I:
 18.0
Interference %:
 2.6

Median C:
 -88.1
80-DEC C:
 -80.8
Median I:
 -110.5
80-DEC I:
 -105.3

0. X: 160122    163034
0. Y: 657382    660106

Downlink Interference

26-APR-89
Coverage DBM:
 -93.0
C/I:
 18.0
Interference %:
 1.9

Median C:
 -88.1
80-DEC C:
 -80.8
Median I:
 -121.0
80-DEC I:
 -116.8

0. X: 160122  163034
0. Y: 657382  660106

Downlink Interference

26-APR-89
Coverage DBM:
  -93.0
C/I:
  18.0
Interference %:
  0.8

Median C:
  -82.6
80-DEC C:
  -10.0
Median I:
  -121.1
80-DEC I:
  -116.8

5,179,722

METHOD FOR DETERMINING MULTIPLE INTERFERENCE IN A MOBILE RADIO SYSTEM

FIELD OF THE INVENTION

The present invention relates to a method for determining the total degree of downlink or uplink interference in the coverage area of a designated base station for a mobile radio system with given channel allocation. The invention is directly related to the problems set in Swedish Patent Applications 8900742-1, 800743-9, 8900744-7 and 8900745-4 and especially to the invention "Method for radio cell planning" (8900744-7). This method utilizes field strength measurements and an allocation algorithm which provide the possibility of a simple adaptation of the cell system, that is to say increase or decrease of the number of cells with changed traffic demand. If a computerized channel allocation based on an exclusion matrix has been carried out, a certain minimum quality with respect to the interferences in the system is ensured in a first approximation. The quality is ensured in the coverage area of a designated base station for each of the interference sources but not for the combined interference from all co-channel and adjacent-channel interference sources. It is necessary either to use allocation algorithms which take account of the sum of interferences, see Patent Application 8900742-1 "Method for resource allocation in radio systems", or to use methods for carrying out, after a conventional channel allocation has been carried out, a check of to what extent total interference requirements are met. The present invention relates to the latter case and provides a method for carrying out a control relating to the total interference situation.

DISCUSSION OF BACKGROUND

The problem with multiple interferences in cell systems has been known for some time. However, what has not been known previously is how interference between two cells in a metropolitan environment can be described with sufficient accuracy in a quantitative way. A new measuring technique developed at Televerket Radio, however, provides a detailed pattern of the complicated wave propagation in a city environment and has created the prerequisites for very detailed interference studies and thereby also for studies of multiple interference between cells.

SUMMARY OF THE INVENTION

According to the invention, a method is provided for checking for a given channel plan in a mobile radio system that multiple interferences in the coverage areas of the different base stations meet the required limit values.

The main characteristics of the method can be obtained from the patent claims following.

BRIEF DESCRIPTION OF THE DRAWINGS

The invention will now be described in greater detail with reference to the attached drawings, in which.

DETAILED DESCRIPTION OF THE INVENTION

The background for the present invention is a measuring technique newly developed at Televerket Radio, which opens up quite new possibilities for describing the wave propagation in a metropolitan environment.

The prerequisites are that there is a number of base stations each with its coverage area and a frequency band for the system with a limited number of channels. There is also a requirement for the C/I carrier to interference noise ratio which is needed for good reception and how much interference a receiver can tolerate in adjacent channels. A set of for example base stations using the same or adjacent channels can be considered a "relevant pair" of stations.

Using a specially calibrated receiver equipment, the received power from all base stations is measured on relevant traffic routes in the geographical area which is covered by the mobile radio system. For these measurements, the measured field strengths form mean values over sections of 20 m (approximately 30 wavelengths) and each section is tied to a co-ordinate information. The field strength values are represented in dBm in the measurement data of the received signal power. The measurements are not as extensive as it sounds since field strengths from up to twelve base stations can be registered at one time as a matter of fact. It is quite possible to make all necessary measurements for one cell including coverage and interference area in one night. This type of measurement has already been carried out with success in the Stockholm area.

The measurements provide knowledge about which potential power a receiver in a mobile unit would receive from different cells wherever the mobile unit is located within the geographical area. The potentially received power originating from mobile units within the coverage area can also be easily calculated at an arbitrary base station. Thus, the interference situation both for the mobile units and the base stations are known.

Since the interferences can be described on the one hand with respect to the base station receivers and on the other hand with respect to the receiver of the mobile units, there exists an uplink interference and a downlink interference.

Figure 1:
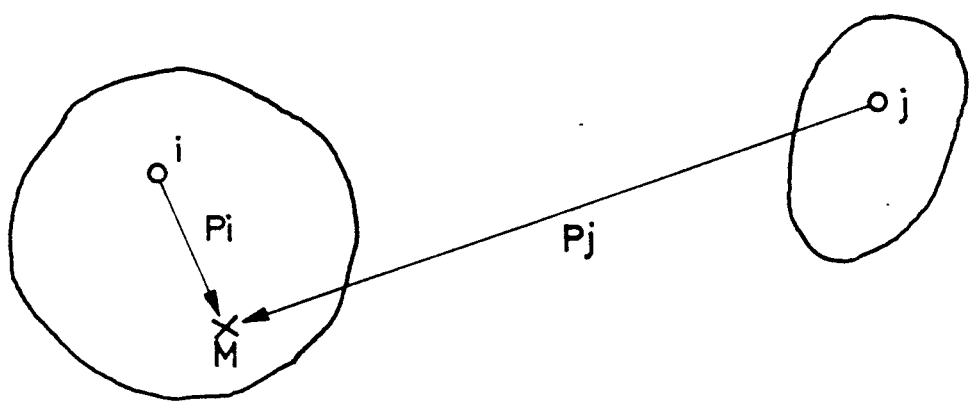
FIG. 1 shows how a mobile unit is exposed to interference from a neighboring base station.

The downlink situation is shown in FIG. 1. Assume that all the base stations together with the corresponding service areas are numbered from 1 to N. In FIG. 1, two stations i and j are shown with associated service areas. A mobile unit M in the ith coverage area receives a wanted power Pi from its own base station and an unwanted interference power Pj from the base station number j. There is a small difference between the terms "service area" and "coverage area". By coverage area is here meant all measured roads which, with respect to a given base station, have a sufficiently high received power to allow satisfactory reception. In a service area, there can be unmeasured points with good reception.

The minimum allowable C/I (carrier to interfrence) noise ratio for acceptable co-channel quality is LP1 and the minimum allowable C/I for acceptable quality with interference in the first adjacent channel is LP2 and so forth. For the (k−1)th adjacent channel, C/I must be greater than LPk, k≦M. A diagram plot can be produced in which geographical points, for which it holds true that $$P_i/P_j < LP_k$$

$$k = 1, 2, \ldots M$$

are marked by the symbol "0" and the remaining points are marked by the symbol ".". This provides a pattern where noisy points are marked by "0" and points with acceptable reception are marked by ".".

M is the number of necessary co-channel and adjacent-channel limit values.

Figure 2:
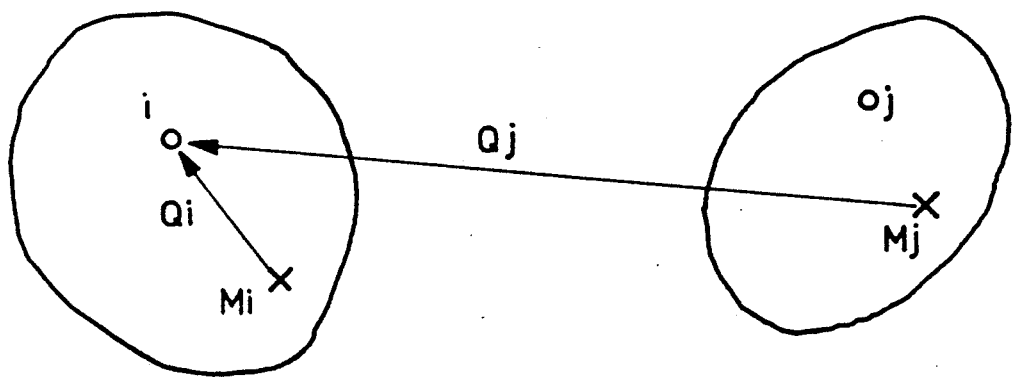
FIG. 2 shows how a base is exposed to interference from a mobile unit in the neighboring area.

FIG. 2 shows the uplink situation. In the figure are shown two base stations i and j with associated service areas. In this case, the base station i is exposed to interference Qj from a mobile unit Mj in the coverage area of base station j. The base station i receives a wanted power Qi from a mobile unit Mi in its coverage area. The coverage areas are defined in the same way as earlier or possibly adjusted for any imbalance uplink in the power budgets for up- and downlink.

The uplink interference is calculated in the following way. When the mobile unit Mj in FIG. 2 passes through the entire coverage area of base j, a noise power i is generated in the base i. The minimum allowable C/I noise ratio for acceptable co-channel quality is designated by LQ1 and the minimum C/I for acceptable quality for the first adjacent channel is designated by LQ2 and so forth. For the (k−1)th adjacent channel, C/I must be greater than LQk, k≦M, in the same way as earlier. The noise power varies in dependence on the interfering mobile unit's instantaneous position and its different noise power production can be statistically characterized by means of a distribution function.

a) The distribution function is calculated with a starting point from the measured field strength values. The noise values are generated by randomization according to said distribution, which can be implemented, for example, by letting all cases of noise production be represented in table form and carrying out a uniform designation of all numerical values of the table. All the values are thus stored in their own memory location and selection is carried out uniformly over all the addresses of the memory locations.

Assuming that a mobile unit Mi passes through the coverage area i and in doing so receives coverage field strength Qi and a random noise field strength Qj at a given point in the coverage area. In the same way as above, a diagram plot of the interference situation can be produced by marking geographical points for which it holds true that Qi/Qj < LQk.

Due to the fact that the noise field strength Qj is randomized, the Qi/Qj ratio becomes a stochastic variable. The consequence is that the diagram plot also becomes stochastic and assumes a new appearance each time the calculation is carried out. In practice, it is found that diagram plots produced in this way are gathered well around their "mean value" and that a single occurrence can be considered as representative. If one is not satisfied with this, there is always the possibility of estimating the mean value of the diagram plot by simulating the interfering mobile unit's effect several times in the manner described above.

b) The distribution function is approximated by a logarithmically normal distribution. It is well-known from the literature that noise field strengths originating from mobile units located the same distance from the base have an almost logarithmically normal distribution. This also applies with good approximation to noise field strengths in a base from mobile units in an adjoining coverage area. The log-normal distribution is completely determined by mean value and spread, which parameters can be easily calculated from the given measured noise field strengths. Compared with case a), it is not the distribution function which is calculated but only the mean value and spread of the true distribution of noise values. The true distribution is further approximated by a logarithmically normal distribution. The median for the true logarithmated noise field strengths can be used very well as mean value in the log-normal distribution. The simulated noise powers are generated with the aid of a generator of normally-distributed numerical values and knowledge of the mean value and spread as above.

The power values Q in the base stations from transmitting mobile units can be directly related to the power values P from transmitting base stations due to the fact that the transmission loss between base and mobile unit does not depend on the direction of transmission. Since P-values are simply obtained from measured wave propagation data, this also applies to Q-values.

Figure 3:
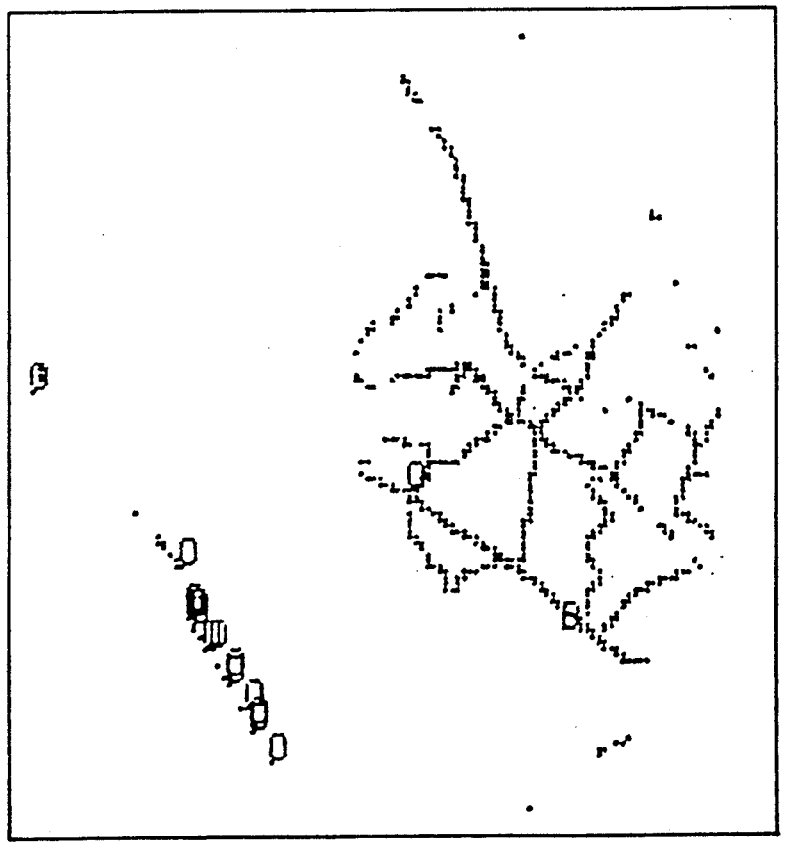
FIG. 3 shows the base station in Vällingby with that part of the surrounding road network which has coverage and points where interference from Skarholmen impinges on the base-to-mobile communication, FIG. 4 again shows the base station in Vällingby but in this case with interference from Odenplan.
Figure 4:
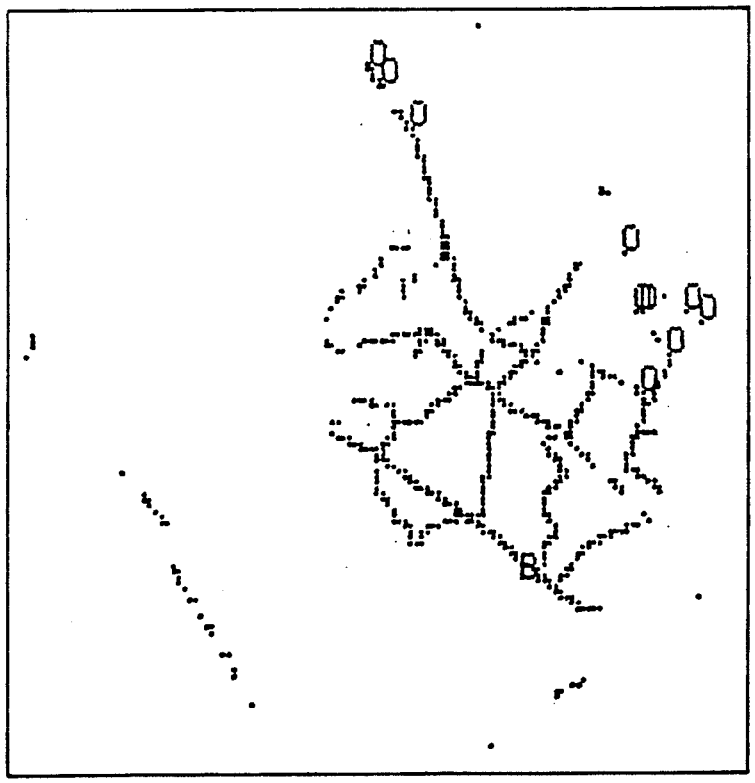

FIGS. 3 and 4 show an illustration of the diagram plots where there can be seen, on the one hand, the road network where the home signal strength from the base station is sufficiently high for satisfactory reception, which we call coverage, and, on the other hand, positions in the coverage area where the reception is disturbed by the base stations in Skarholmen and Odenplan, respectively. An interference percentage is defined which is the percentage of coverage with disturbed reception. The diagram plots show the noise received by the mobile unit (downlink interference) but it is equally when possible to describe in the same way where the mobile unit is located close to the base station and is disturbed by a mobile unit in the adjoining coverage area (uplink interference). The interference percentage is in both cases 2.6% and 1.9%, respectively. The present invention has application both in the downlink and uplink but since the principles of the application of the invention are the same regardless of the direction of communication, only the downlink is used as an example in the text which follows.

Figure 5:
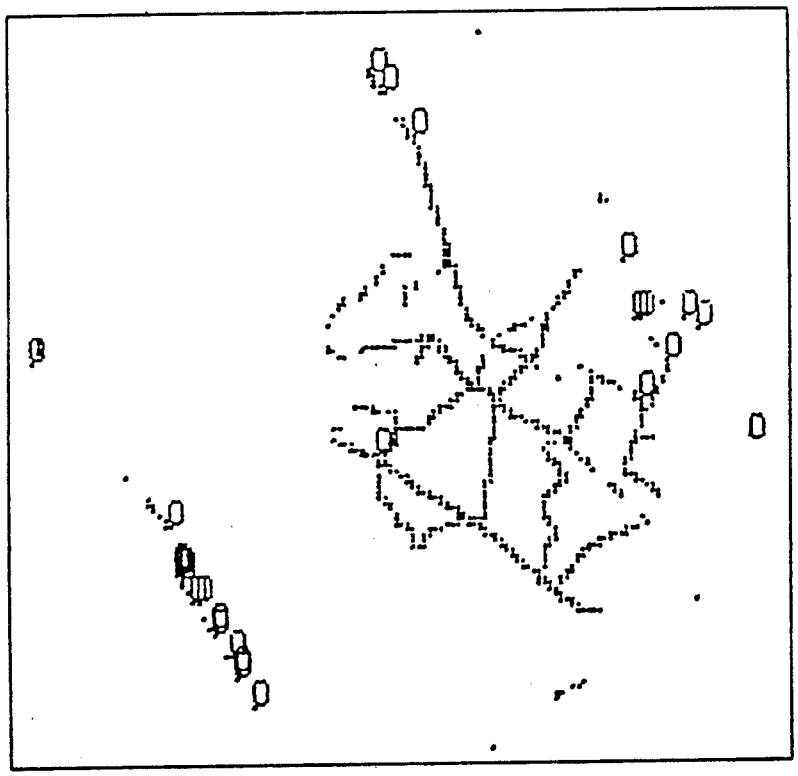
FIG. 5 shows a case with multiple interference in Vällingby caused by the base stations in Odenplan and Skarholmen.

In FIG. 5, an example of calculated interference from both Skarholmen and Odenplan is shown. The noise contributions are virtually additive which is due to the fact that the interferences from the two base stations arrive at different locations in the coverage area and are therefore independent of one another. The diagram plots can be easily added by setting up simple mathematical rules: 0+0=0

$$0 + . = . + 0 = 0$$

$$. + . = .$$

After that, the interference percentage is calculated as above. As shown, the total interference is 4.4%. The uplink interferences in a corresponding situation have a quite different interference pattern but, assuming that the interferences are calculated in a correct manner by Monte-Carlo-simulation, for example by means of the random technique described above, the additivity principle also applies here for small noise contributions. With computerized channel allocation, the individual noise contributions can be easily taken into consideration and care can be taken that pairs of cells do not interfere with one another. It is more difficult, though possible, to ensure during the channel allocation procedure that the total disturbance of the coverage in one cell is kept below a given limit value. With conventional computerized channel allocation, there is reason to check that a proposal for a channel plan does not have disadvantageous characteristics with respect to the sum of the individual noise contributions in each cell.

FIG. 5 shows multiple interference in the coverage area of the base station in Vällingby from only two interfering base stations, but the contributions from all remaining base stations which share the channel with Vällingby will naturally be studied, and also base stations close to Vällingby which use channels adjacent to the base in Vällingby. In the noise pattern shown in FIG. 5, it can be seen that the interferences in just this case are located at the outer edge of the coverage area. As a matter of fact, the interference from Skarholmen has no practical significance since a mobile unit in this part of the coverage comes under quite a different cell. However, interference can arise with high traffic if a mobile unit is not successful in achieving handover to an adjoining cell.

Figure 6:
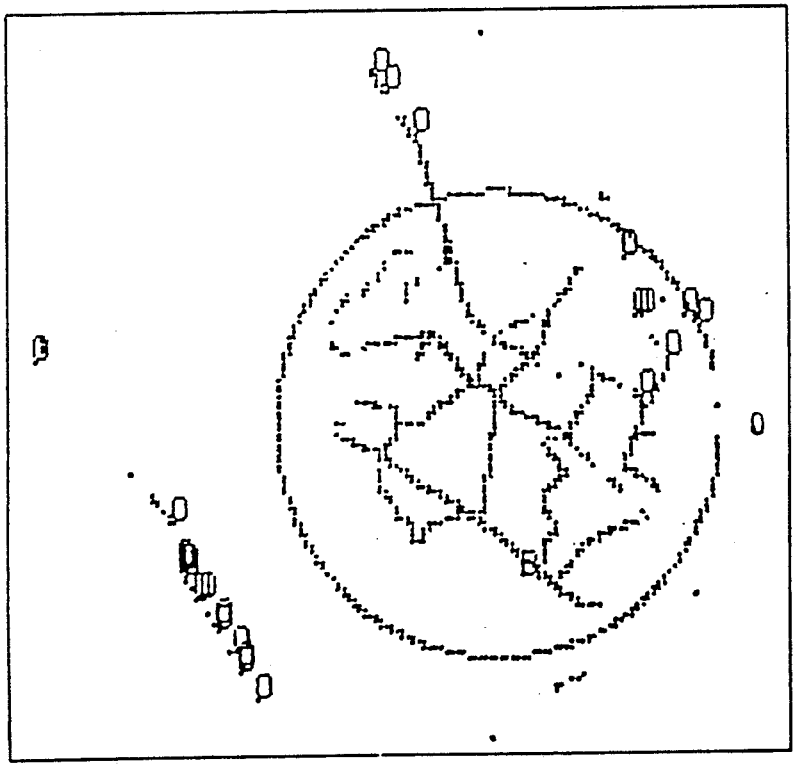
FIG. 6 shows the coverage in Vällingby approximated by the inside of a circle.

FIG. 6 shows a technique which can be used if it is to be defined in greater detail which part of the coverage area is of significance with respect to interference. An arbritary closed contour can be used but in most cases it is sufficient to define the cell coverage with the aid of a circle. Generally, the circle is not centered around the base station site. In calculating the interference percentage, only the disturbances falling within the circle are now taken into consideration. The interference percentage within this circle is 0.8%.

The present invention relates to a method for determining the appearance of the total interference pattern with respect to all possible noise sources in the coverage area of a station. The invention is applicable both for interference at the mobile unit and for interference at the base station.

We claim:

1. A method for planning for and determining interference patterns in a multi-cell multi-channeled frequency mobile radio system, in which said system comprises a plurality of base station cells each of which has an associated coverage area and in which a plurality of mobile stations are used said method of planning comprising the steps of:

propagating a radio signal from each of said base station in said system on each of the frequencies assigned or planned for each base station;

detecting within the geographical area encompassed or planned to be encompassed by each base station and on each of the frequencies propagated therefrom a field strength over all planned major vehicle or pedestrian paths therein;

determining a relevant pairing of base stations within said system, based upon those base stations using or planned to use the same or adjacent frequency channels;

calculating within a plurality of points substantially covering all major paths through the coverage area for a given base station the interference caused by the propagation of radio signals by any other base station which have been determined to be a relevant pair with said given base station;

adding together the interferences of all the relevant pairs of base stations at each point to determine a total interference level at each point.

2. The method as claimed in claim 1, wherein a total interference percentage is produced for each calculated point which constitutes the ratio disturbed coverage of an area that has an interference above a threshold level with those areas having an interference above a threshold level with those areas having an interference level below said threshold.

3. The method as claimed in claim 2, wherein said interference percentage is calculated within the area which defines the planned coverage area of a given base station.

4. The method as claimed in claim 1, wherein a diagram plot is produced by marking geographical points, for which the total interference exceeds a predetermined value, with a first symbol (0) and marking the remaining points with a second symbol (.).

5. The method as claimed in claim 4, wherein the diagram plot is produced within the limits which define the planned coverage area of a given base station.

* * * * *

UNITED STATES PATENT AND TRADEMARK OFFICE
CERTIFICATE OF CORRECTION

PATENT NO. : 5,179,722
DATED      : 01/12/93
INVENTOR(S) : KRISTER GUNMAR ET AL

It is certified that error appears in the above-indentified patent and that said Letters Patent is hereby corrected as shown below:

Column 3, line 1, change "interfrence" to --interference--.

Column 6, line 31, after "ratio" insert --of--.

Signed and Sealed this

Thirtieth Day of August, 1994

Attest:

BRUCE LEHMAN

*Attesting Officer*            *Commissioner of Patents and Trademarks*